United States Patent [19]

Vandenbulcke et al.

[11] Patent Number: 4,764,303

[45] Date of Patent: Aug. 16, 1988

[54] AMINOMETHYLENEPHOSPHONATE COMPOSITIONS

[75] Inventors: Brigitte M. J. Vandenbulcke, Chaumont-Gistoux; Bronislav H. May, Overijse, both of Belgium

[73] Assignee: Monsanto Company, St. Louis, Mo.

[21] Appl. No.: 933,835

[22] Filed: Nov. 24, 1986

[30] Foreign Application Priority Data

Nov. 29, 1985 [GB] United Kingdom ................ 8529409

[51] Int. Cl.$^4$ ............................................. C09K 3/00
[52] U.S. Cl. .................................... 252/385; 252/181; 252/89.1; 252/526; 252/545; 260/502.5 E
[58] Field of Search ....................... 252/385, 181, 89.1, 252/526, 545; 260/502.5 E

[56] References Cited

U.S. PATENT DOCUMENTS

| | | | |
|---|---|---|---|
| 3,368,978 | 2/1968 | Irani | 252/545 |
| 3,470,112 | 9/1969 | Irani et al. | 260/502.5 E |
| 4,374,035 | 2/1983 | Bossu | 252/91 |
| 4,430,243 | 2/1984 | Bragg | 252/91 |
| 4,536,314 | 8/1985 | Hardy et al. | 252/102 |
| 4,561,991 | 12/1985 | Herbots et al. | 252/118 |
| 4,631,141 | 12/1986 | Baxter | 252/95 |

FOREIGN PATENT DOCUMENTS

| | | | |
|---|---|---|---|
| 1596756 | 8/1981 | United Kingdom | 252/99 |
| 2138424 | 10/1984 | United Kingdom | 260/502.5 E |

*Primary Examiner*—Matthew A. Thexton
*Attorney, Agent, or Firm*—R. Loyer; A. Hoffman; A. Cole

[57] ABSTRACT

Granular or powder compositions containing diethylenetriaminepenta(methylenephosphonic acid) and/or its salts in admixture with sodium sulphate and/or bisulphate in an amount, expressed as the equivalent amount of anhydrous sodium sulphate, of at least 60% of the dry weight of the diethylenetriaminepenta(methylenephosphonic acid) and/or its salts can be stored for extended periods while remaining in the form of free-flowing solids.

9 Claims, No Drawings

AMINOMETHYLENEPHOSPHONATE COMPOSITIONS

This invention relates to aminomethylenephosphonate compositions, more especially to compositions which are solids containing diethylenetriaminepenta(methylenephosphonic acid) (DTPMA) and/or its salts.

DTPMA and its salts have a variety of uses, for example as sequestrants, anti-incrustation agents, and stabilisers for hydrogen peroxide. The products are currently available as aqueous solutions containing approximately 50% by weight total diethylenetriaminepoly(methylenephosphonic acids) (DTpMAs) of which typically approximately 70%, but more widely from about 50% to about 80% by weight is DTPMA and most of the remainder is diethylenetriaminetri(methylenephosphonic acid).

For certain applications, it would be desirable to be able to handle DTPMA and/or its salts in the form of solids. However, recovery of solids by crystallisation from the solutions is inefficient, and the solids which are obtained as residues by evaporation of aqueous solutions are hygroscopic and in some instances deliquescent.

We have now found that certain granular or powder compositions containing DTPMA and/or its salts in admixture with sodium sulphate or sodium bisulphate in an amount, expressed as the equivalent amount of anhydrous sodium sulphate, of at least 60% of the dry weight of the DTPMA and/or DTPMA salt, can be stored for considerable periods while remaining in the form of free-flowing solids.

In determining the figure of 60%, other DTpMA components in a mixture of DTpMAs and/or DTpMA salts are not taken into consideration.

In general, compositions which contain DTPMA as such, i.e. in the acid form, rather than in the form of DTPMA salts, have better storage stability, i.e. remain as free-flowing solids for longer. Alternatively expressed, in compositions containing DTPMA and DTPMA salts, the storage stability decreases as the proportion of DTPMA salts increases, at a given level of sodium sulphate/bisulphate. Storage stability at a given ratio of DTPMA/DTPMA salt increases as the amount of sodium sulphate/bisulphate increases. Although there is no necessary upper limit to the ratio of sulphate/bisulphate to DTPMA/DTPMA salt in the composition of the invention, in practice it will be usual to use not significantly more sodium sulphate/bisulphate than is required to achieve the desired degree of storage stability. Typically, the compositions of the invention contain sodium sulphate or sodium bisulphate in an amount, expressed as the equivalent amount of anhydrous sodium sulphate, of from 60% to 200%, for example from 60% to 150% of the dry weight of the DTPMA and/or DTPMA salt.

The commercially most significant salt is the sodium salt, but the invention is also applicable to other DTPMA salts, for example other alkali metal salts, ammonium salts and alkaline earth metal salts.

The compositions of the invention can be produced in various ways. For example, solutions containing the components of such compositions can be formed by adding sodium sulphate or bisulphate to a solution, or a neutralised or partially neutralised solution, of DTPMA. Alternatively the sodium sulphate and/or sodium bisulphate can be formed in situ by the addition of sodium hydroxide to a solution of DTPMA and sulphuric acid. Use of increasing amounts of sodium hydroxide in this procedure results in the formation of sodium sulphate rather than sodium bisulphate, and progressive deprotonisation of the phosphonic acid groups of the DTPMA. The compositions of the invention are obtained by evaporation of such solutions to dryness or to low moisture content, for example a maximum of 10% of the weight of the composition, most conveniently by spray drying.

As indicated above, in compositions containing DTPMA and DTPMA salts, the storage stability decreases as the proportion of DTPMA salts increases, at a given level of sodium sulphate/bisulphate. This effect can be quantified in terms of the acidity of the solutions from which the compositions of the invention can be obtained by evaporation as described above. Thus, preferred compositions are obtained by the evaporation of solutions which, at a 10% by weight concentration of the components, have a pH less than 7, for example from 1.0 to 6.5.

Other components may be present in the compositions of the invention provided they do not adversely affect the storage stability of the product to a significant extent. Examples include certain other alkali metal salts such as sodium chloride (which may be present because some commercial solutions of DTPMA contain hydrochloric acid). Preferably, however, the amount of sodium chloride does not exceed 10% of the total weight of the composition. Other examples include other non-hygroscopic inert organic or inorganic materials, for instance aluminosilicates or surface active agents.

The invention is illustrated by the following Examples.

EXAMPLE 1

(Control)

A solution containing 20% by weight of diethylenetriaminepoly(methylenephosphonic acid)s (DTpMAs) was prepared. Approximately 70% of the total poly(methylenephosphonic acid)s was the penta(methylenephosphonic acid) and most of the remainder was the tri(methylenephosphonic acid).

The solution was divided into portions, and each portion was diluted to approximately 10% concentration. The pH values of the solutions thus obtained were adjusted to different levels, as shown in the table below, by the addition of sodium hydroxide solution. Each solution was then spray dried to a powder having a particle size of 10–40 um using a laboratory spray dryer. Characteristics of the powders obtained are given in the following table.

| | % by weight moisture in | Product after 24 hours storage at 25° C., 80% RH | |
|---|---|---|---|
| pH of solution | initial product after spray drying | % by weight moisture. | Appearance |
| 2 | 12.3 | 13.2 | Caked |
| 4 | 11.1 | 15.8 | Paste |
| 6 | 12.4 | 27.3 | Paste |
| 8 | 14.3 | 36.5 | Paste |

EXAMPLE 2

A solution of DTpMAs was prepared as in Example 1. Sulphuric acid was then added so that the total in the solution was an amount equivalent to 74% of $Na_2SO_4$ relative to the dry weight of DTpMAs, i.e. about 106% of Na₂SO₄ relative to the dry weight of DTPMA. Portions of diluted (10%) solution were adjusted to different pH levels and then spray dried. Results are shown below.

| pH of solution | % by weight moisture in initial product after spray drying | Product after 24 hours storage at 25° C., 80% RH | |
|---|---|---|---|
| | | % by weight moisture. | Appearance |
| 2 | 7.1 | 7.9 | Mobile powder |
| 4 | 7.2 | 12.0 | Mobile powder |
| 6 | 6.7 | 22.6 | Mobile powder |
| 8 | 9.6 | 33.1 | Caked |
| 10 | 8.6 | 32.9 | Caked |

EXAMPLE 3

Example 2 was repeated that the amount of sulphuric acid added gave a total equivalent to 111% of Na₂SO₄ relative to the dry weight of DTpMAs, i.e. about 159% of Na₂SO₄ relative to the dry weight of DTPMA. Results are shown below.

| pH of solution | % by weight moisture in initial product after spray drying | Product after 24 hours storage at 25° C., 80% RH | |
|---|---|---|---|
| | | % by weight moisture. | Appearance |
| 3.1 | 6.4 | 8.2 | Mobile powder |
| 4.1 | 8.5 | 11.3 | Mobile powder |
| 5.1 | 10.2 | 15.3 | Mobile powder |
| 6.1 | 4.45 | 16.0 | Mobile powder |

Comparison of the results of Examples 2 and 3 with those of control Example 1 shows the advantages of the compositions of the invention relative to spray dried DTPMAs alone.

We claim:

1. A composition in mobile granular or powder form consisting essentially of diethylenetriaminepenta(methylenephosphonic acid) and/or a salt of diethylenetriaminepenta(methylene phosphonic acid) in admixture with sodium sulphate and/or bisulphate in an amount, expressed as the equivalent amount of anhydrous sodium sulphate, of from 60% to 200% of the dry weight of the diethylenetriaminepenta(methylenephosphonic acid) and/or its salt said composition when in aqueous solution at a concentration of 10% by weight exhibiting a pH of less than 7.

2. A composition according to claim 1 in which the salt of diethylenetriaminepenta(methylenephosphonic acid) is the sodium salt.

3. A composition according to claim 1 which contains a mixture of diethylenetriaminepoly(methylenephosphonic acids) and/or salts, of which from 50% to 80% by weight is diethylenetriaminepenta(methylenephosphonic acid) and/or its salts.

4. A composition according to claim 1 which has been obtained by evaporation of an aqueous solution containing components which on evaporation will provide such a composition, the acidity of said solution being such that at a 10% by weight concentration of the components it has a pH less than 7.

5. A composition according to claim 4 obtained from a solution which at a 10% by weight concentration of the components has a pH of from 1.0 to 6.5.

6. A composition according to either of claims 4 and 5 having a moisture content of 10% by weight or less at the completion of the evaporation.

7. A composition of claim 1 wherein the pH of the aqueous solution is in the range of from about 1 to about 6.5.

8. A composition of claim 7 wherein the pH is 6.1.

9. A composition in mobile granular or powder form consisting of diethylene triaminepenta(methylenephosphonic acid) in admixture with sodium sulphate and/or bisulphate in an amount, expressed as the equivalent amount of anhydrous sodium sulphate, of from 60% to 200% of the dry weight of the diethylenetriaminepenta(methylenephosphonic acid) and/or its salt said composition when in aqueous solution at a concentration of 10% by weight exhibiting a pH of less than 7.

* * * * *